United States Patent [19]

Black

[11] 4,361,531
[45] Nov. 30, 1982

[54] CONTAINER MOLDING AND TRIMMING METHOD AND APPARATUS

[75] Inventor: Michael Black, Mount Dora, Fla.

[73] Assignee: Doric Foods Corporation, Mount Dora, Fla.

[21] Appl. No.: 305,158

[22] Filed: Sep. 24, 1981

Related U.S. Application Data

[62] Division of Ser. No. 24,690, Mar. 28, 1979, Pat. No. 4,305,904.

[51] Int. Cl.³ ............................................. B29C 17/12
[52] U.S. Cl. ..................................... 264/161; 225/99; 425/315; 425/525
[58] Field of Search ......................................... 264/161

[56] References Cited

U.S. PATENT DOCUMENTS

| | | | |
|---|---|---|---|
| 3,172,152 | 3/1965 | Uhlig | 264/536 |
| 3,429,211 | 2/1969 | Pelot | 82/46 |
| 3,677,454 | 7/1972 | Boyer | 225/99 |
| 3,752,629 | 8/1973 | Gordon | 264/536 |
| 3,795,162 | 3/1974 | Jaeger | 83/605 |
| 3,989,786 | 11/1976 | Mehnert | 264/536 |
| 3,994,651 | 11/1976 | Kamibayashi | 264/536 |
| 4,124,668 | 11/1978 | Frohn | 264/536 |

Primary Examiner—Maurice J. Welsh
Attorney, Agent, or Firm—Duckworth, Allen, Dyer & Pettis

[57] ABSTRACT

A method and apparatus for molding plastic containers and the like and for removing unwanted flash material therefrom. In the molding step, an unwanted tail flash portion is molded to have a weakened area along the line of attachment to the bottom of the container. After ejection from the mold, the container is conveyed to a tail removal device that grips and tears the tail free from the container along the weakened line area by a downward and rearward force.

6 Claims, 10 Drawing Figures

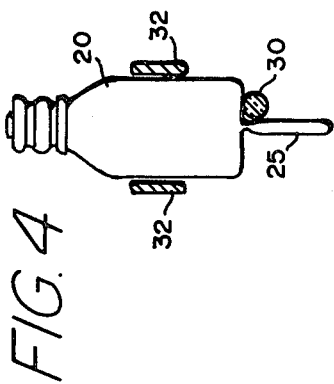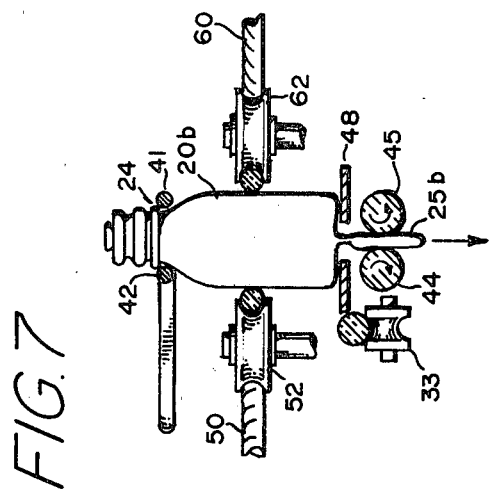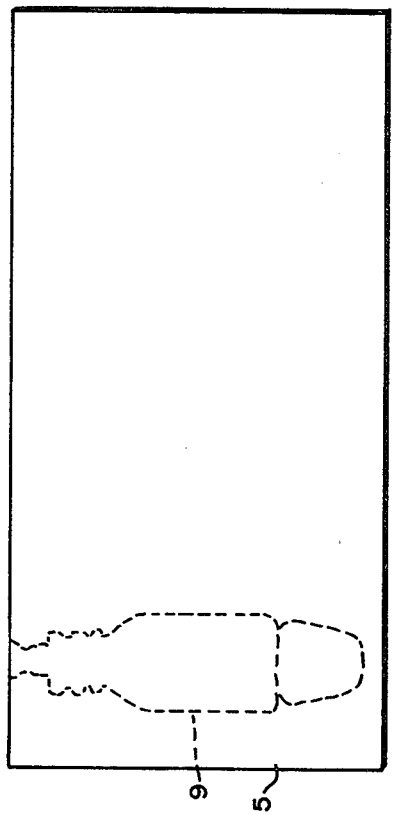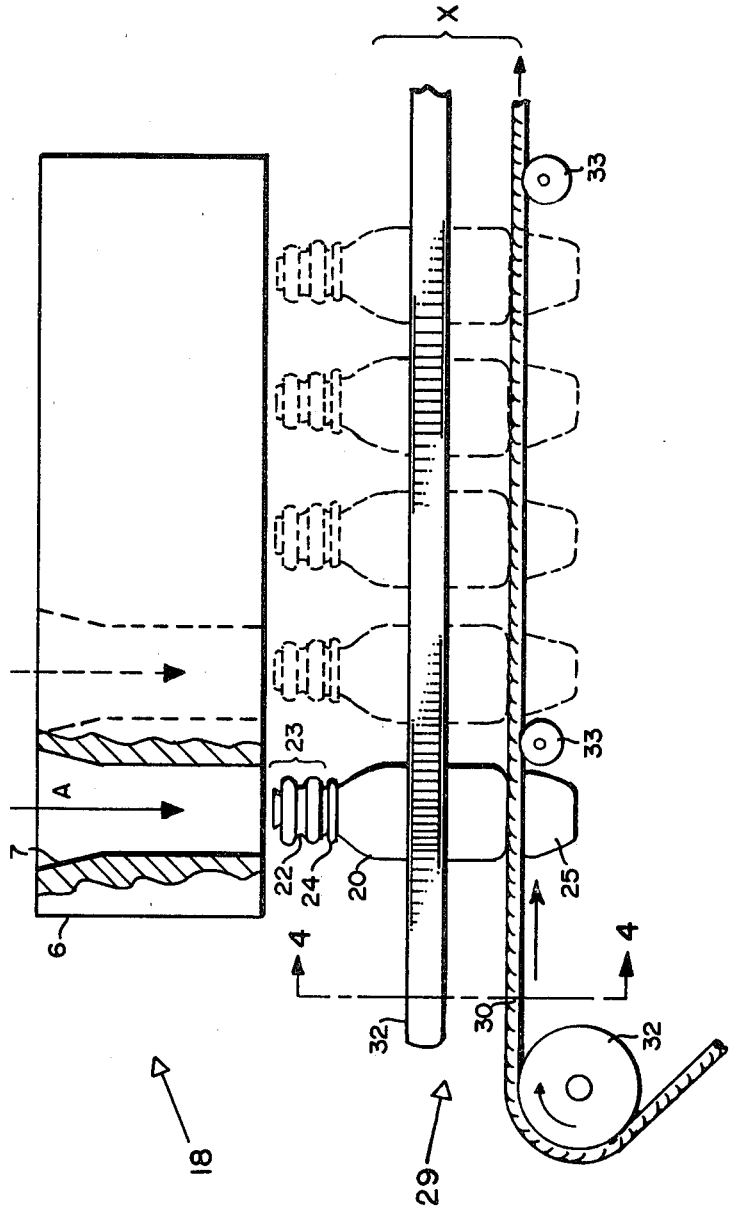

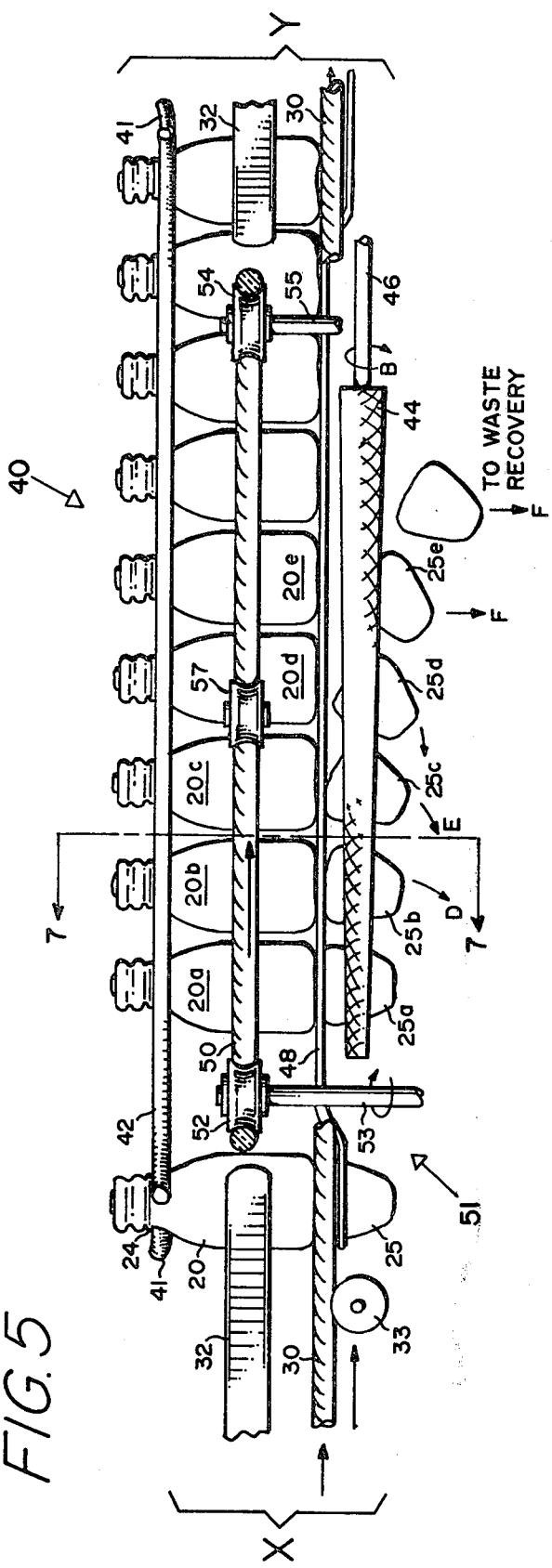
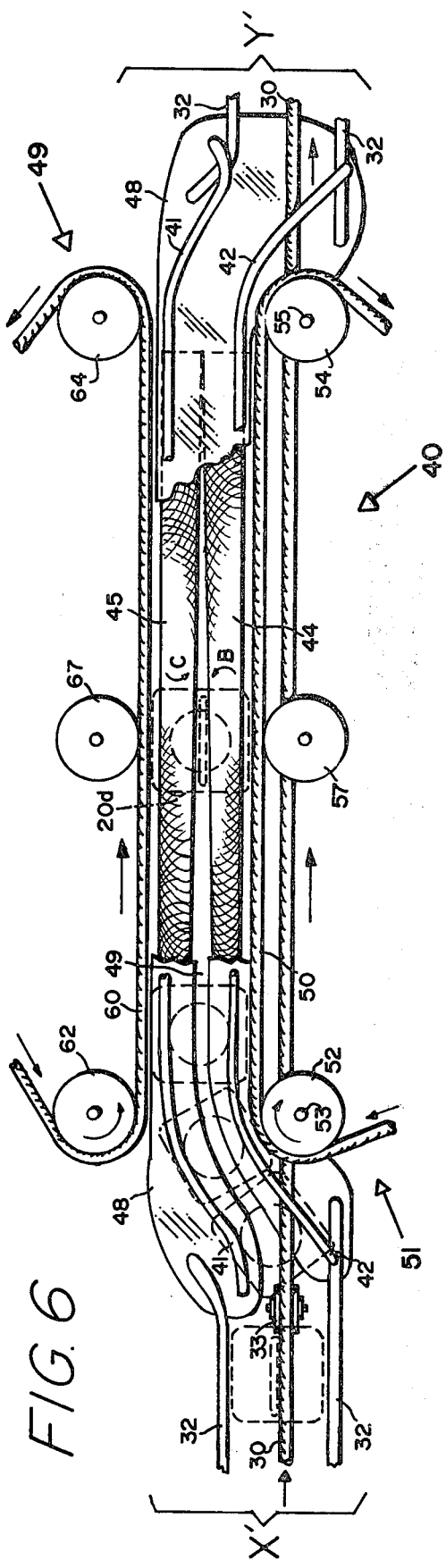

CONTAINER MOLDING AND TRIMMING METHOD AND APPARATUS

This is a division, of application Ser. No. 024,690 filed Mar. 28, 1979 and now U.S. Pat. No. 4,305,904, issued Dec. 15, 1981.

BACKGROUND OF THE INVENTION

1. Field of the Invention

The present invention relates to a method and apparatus for blow molding plastic containers and the like and for removal of unwanted flash material therefrom, and particularly to molding of the dome portion and tail portion of the containers to facilitate removal thereof.

2. Description of the Prior Art

In the process of molding bottles or other containers, the articles are formed from an extruded parison held between a pair of mating mold halves. After forming of the article, the mold halves are separated and the molded article ejected. It is common for flashings, which refers to a fin-like web projecting from the surface of the material, to be formed at the parting line across the bottom of the bottle or container where the mold halves are in engagement. It is also common for a ball-like dome to form at the top of the container above the neck. These flashings must then be removed in a separate operation, either by hand or by automatic machines.

While there are many devices and apparatus for removing flashings, the most common approach is to utilize mating dies that grip around the neck of the container and at the bottom of the container. When such dies are used, the container must be rigid to be able to remain its shape under the force of the dies. Immediately after molding of the container, the plastic material remains in a softened condition and therefore it is necessary to cool the container before conventional trimming operations can be accomplished. The storage, handling, and entering of containers in an automatic machine utilizing dies requires additional space and costs. Such equipment is relatively expensive since the dies must be matched to the shape of the container in production.

Machines have been developed in the prior art for trimming bottles or containers while still hot but which have required specific jigs to hold an individual bottle during trimming. For example, in U.S. Pat. No. 3,795,162 to Jaeger, a milk container is held by its neck and handle while a swinging arm cuts the tail flashing from the bottom of the bottle. Other apparatus for removing the tail flashing from a blown container as taught in U.S. Pat. No. 3,677,454 to Boyer, uses a chain and bar mechanism positioned below the dies of the blow molding machines which grasps the tail portion and moves the article up an inclined plane in a direction away from the moving chain. In effect, the tail surface is held and the container forced upward with a tearing motion. In this approach, the container must move through several planes, and changes of direction of motion are required resulting in a complex and expensive equipment. Apparatus for removing flashing such as a dome from the neck of a molded container includes that described in U.S. Pat. No. 3,429,211 to Pelot, which requires a fixed guide and a movable guide gripping the hollow neck while moving the unwanted portion against an adjustable cutting tool obliquely disposed along the direction of travel of the containers. Thus, a special neck design of the bottle is required to utilize this apparatus since a specific type of groove in the neck of the container must be provided to match the fixed and movable guides.

SUMMARY OF THE INVENTION

The apparatus of the present invention provides a mold with special shaping of the dome portion and the tail portion of the container; a conveyor for moving containers from the mold to a tail removing element, and for further transport to a dome removing element.

The containers in accordance with the invention have a round neck and mouth section. In the mold, the waste portion above the neck and mouth section is formed to provide a deep groove around its periphery. The tail portion is molded to have a pinched in or weakened area along a line where the tail is attached to the bottom of the container. Each end of the weakened line area is notched.

A group of containers is ejected from the mold via a guiding device onto a moving drive rope type of conveyor such that the tail is aligned with the direction of travel of the drive rope. The containers are then moved into a device which grips the tail as the containers are moving along the line of the guide. The gripping device is arranged to also apply a gradually increasing downward pull on the tail effectively tearing the soft web free from the bottom of the container starting at the notch and continuing through the weakened line area. The waste tail is collected for re-use. As the containers move from the tail removing device, they are guided into the dome removal section of the apparatus. The containers leave the conveyor and are caught by a moving endless rope drive arranged to engage the dome section of the container and to urge one side thereof against a sharp stationary cutting edge aligned with the rope drive. The moving rope causes the entire container to rotate against the stationary blade, cleanly cutting the dome section free from the container. After the dome is completely separated from the container, it is collected for subsequent re-use of its material. At this point, the trimmed containers are discharged from the apparatus for packing or other operations.

The tail flash removing device consists of a novel gripping and tearing element comprised of two tapered elongated rollers disposed in a horizontally opposed fashion with the tapers causing a slight angle between the two rollers, forming a V with the open end of the V toward the incoming containers to be trimmed. The container guide and conveyor includes a slotted base portion through which the tail flash extends, allowing the bottom of the container to rest on the guide surface, with the tail portions of each container longitudinally aligned in the direction of movement. While various positive means are available for moving the containers, a novel rope drive technique is utilized which provides movement of the containers without damage to the still soft plastic. A pair of parallel endless rope-like belts formed from an elastomeric material is disposed along the direction of desired travel of the containers and in contact with opposite sides of each container. Due to the friction between the elastomeric rope and the sides of the plastic container, the movement of the rope carries the containers along the desired path.

The conveyor thus moves the tail portion of each container into the open end of the V formed between the two rollers. Each roller is knurled or serrated with the serrations forming an angle with the axis of the rollers. The rollers are rotated inwardly and downwardly at a peripheral velocity about twice the velocity of the conveyor such that the opposing faces of the rollers are rotating downward. As the tail flash of a container is carried in between the rollers, it will move freely until the space between the rollers becomes approximately equal to the thickness of the tail flash. At this point, the serrations first grip the soft tail flash and, due to the downward rotation of the two roller faces, a downward pull or tearing motion is applied to the leading edge of the tail flash. Simultaneously, the container is being moved further into the V space between the rollers by the conveyor. The downward pull and forward motion result in a diagonal force vector which tends to tear the tail along the weakened line at the mold seam on the bottom of the container. As may be seen, the first downward pull is applied to just the leading edge of the tail flash; however, as the container continues to move, more and more of the surface of the tail flash is gripped by the counter-rotating rollers with the downward force thereby increasing as a larger portion is gripped. The gripping action can be understood to therefore continue to tear away the flash as the container progresses until the point is reached at which the tail flash is completely separated from the bottom of the container. The area of the rollers over which this operation will occur with respect to the rollers is determined by the thickness of the web forming the tail flash which may vary slightly from container to container. Therefore, the tapered rollers advantageously will accomodate various thickness. The separated section of plastic forming the tail flash may be collected by a vacuum system and returned for recycling of the plastic.

As the container leaves the tail removal section and enters the dome cutting portion of the apparatus, the container must be free to rotate about an approximate center axis. Where rectangular or square bottles are being trimmed, the guides and drive rope would interfere with the rotation. Consequently, the container is transferred from the primary rope drive to a secondary rope drive having a more positive action and space for the required rotation. The rope is formed from an elastomeric material having a high coefficient of friction with respect to the bottle material. The belt engages the groove molded into the dome section on one side and forces the opposite side tightly against a serrated guide rod on the opposite side. The motion of the belt is to rotate the container by its dome section as the container is moved forward, causing the cutter edge to completely separate the dome after one complete revolution. The serrated rod prevents slipping as the container is rotated.

After rotation of the container and removal of the dome, the trimmed containers leave the rotational drive and are carried from the dome trimming section to the primary rope drive.

It is necessary for square or rectangular bottles or containers to be able to rotate in the cutter portion of the apparatus without interference with each other. Therefore, a selected space between successive containers in the line must be provided. To this end, a spacing guide is provided at the entry to the dome removal system of the apparatus.

As may be noted, the apparatus in accordance with the invention provides a simple inexpensive apparatus which quickly and easily removes the tail flash and dome flash from blow molded plastic containers while still hot from the mold quickly and cleanly and collects the waste material for re-use. The containers remain hot from the mold and relatively soft for ease of trimming for approximately three minutes. Advantageously, the transit time through a trimming apparatus in accordance with the invention may be on the order of 178 minutes and before cooling occurs. The pre-molding of the waste portions of the containers is used to advantage in removing the tail portions quickly and cleanly without damage to the containers, and in rotating the dome portion against a cutter for positive trimming.

It is therefore a principal object of the invention to provide a method and apparatus for molding plastic containers and similar articles in which the waste flash portions thereof are specially formed to facilitate removal from the article after ejection from the mold.

It is another object of the invention to provide apparatus that will sequentially mold a plastic container, eject the container from the mold, remove the tail flash portion, and remove the neck flash portion.

It is another object of the invention to provide improved apparatus for removing the tail flash from freshly molded plastic containers utilizing a novel counter-rotating knurled roller assembly for gripping and tearing of the tails from the bottom of the plastic containers without damage thereto while the containers are in motion.

It is still another object of the invention to provide an apparatus for engaging a special groove molded into the waste portion above the neck area of a plastic molded container to thereby rotate the container.

It is a further object of the invention to provide apparatus having a knife edge against which the neck areas of the plastic mold containers are rotated for removing of the upper waste area.

It is still a further object of the invention to provide a blow mold apparatus which will mold a groove around the peripheral of the waste plastic above the neck area of a plastic molded container.

It is another object of the invention to provide apparatus for blow molding of a plastic container having a tail flash area in which the tail portion is molded to have a pinched-in or weakened area along the line where the tail is attached to the bottom of the container.

It is another object of the invention to provide apparatus for molding a plastic container having a tail flash area in which a weakened line area along the tail portion includes a notch to facilitate starting of a tear during subsequent separation of the tail portion from the container.

These and other features and objects will be most readily understood from the following detailed description of the invention with reference to the included drawings.

BRIEF DESCRIPTION OF THE DRAWINGS

FIG. 1 is a cross-sectional view of a pair of split-mold halves showing the cavities therein for blow-molding of a square-bodied plastic container suitable for juices and the like;

FIG. 3 is a greatly simplified and partial side view of the molding section of the invention showing the ejection of molded containers onto a conveyor system;

FIG. 4 is a cross-sectional 4—4 of FIG. 3 showing the position of a molded container on the conveyor system;

FIG. 5 is a greatly simplified and partial side view of a section of the invention utilized to remove the tail flash portion from the molded containers;

FIG. 6 is a top view of the tail removal section of FIG. 4 in greatly simplified and partially cut-away form to show certain details thereof;

FIG. 7 is a cross-sectional view of FIG. 5 at plane 7—7 showing in more detail the secondary rope drive system and the counter-rotating rollers;

DETAILED DESCRIPTION OF THE PREFERRED EMBODIMENT

The present invention is to be described hereinafter as applying to a method and apparatus for producing bottles, containers, or other like articles manufactured from heat deformable plastic material that is extruded into a parison, injected into a mold, and shaped by a blow method or the like to a desired final configuration within the mold.

Figure 1:
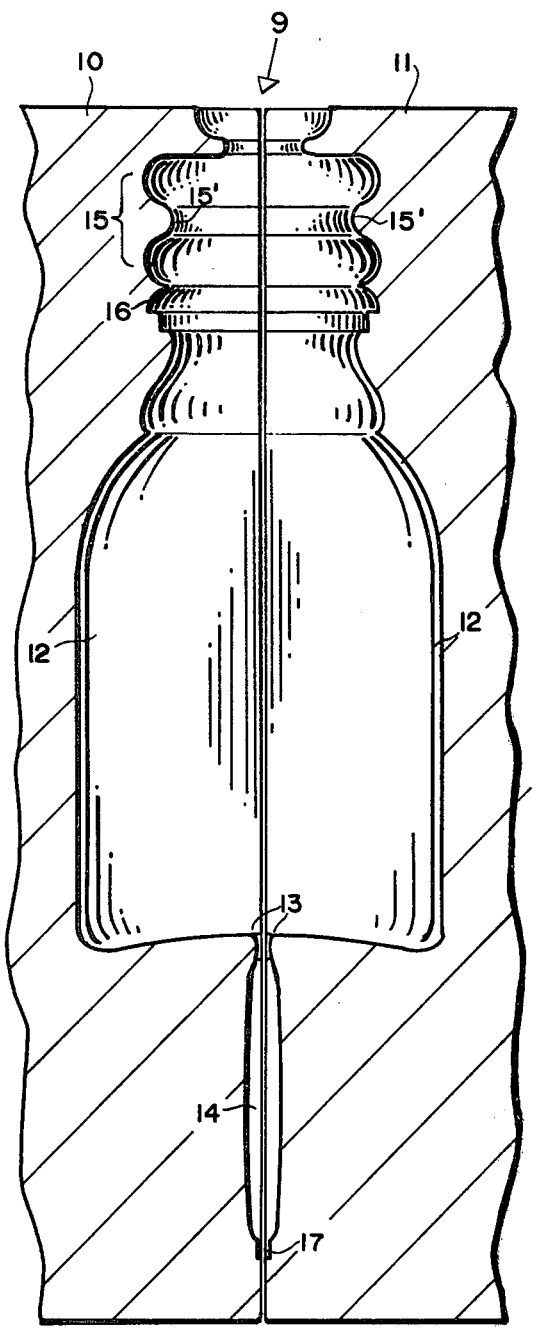

An element of the present invention is a special formation of the waste or "flash" portions of the final molded article. While any number of different types of containers may be manufactured utilizing the method of this invention, a preferred embodiment will be described with reference to a small square bottle having a rounded neck and mouth thereof, such as may be made in a six ounce size for containing fruit juices and the like. Referring to FIG. 1, a partial cross section of a set of split mold cavity blocks is shown by numerals 10 and 11. This set of mold cavity blocks is used in conjunction with a typical blow mold machine which is well known to those skilled in the art and therefore only a portion of the cavity blocks having a single bottle mold 9 is illustrated in the drawing with the special design of the flash or waste portions shown. The main body of the bottle is indicated by cavity 12 with the desired cavity for forming the neck and sealing portion of the bottle shown at 16. Portions of the mold above the neck rim and lip 16 are indicated by the numeral 15 and represent waste portions thereof. Waste portion cavity below the bottle 12 is shown by the numerals 13, 14 and 17. The portion of the bottle above the neck lip 16 is known as a "dome" formed by mold part 15. As seen in FIG. 3, the dome portion of a finished bottle 20 is identified by numeral 23. Of particular note is the circular groove 22 as seen in FIG. 3 produced in the blown bottle by the mold portion 15' as will be discussed in detail hereinbelow.

Figure 2:
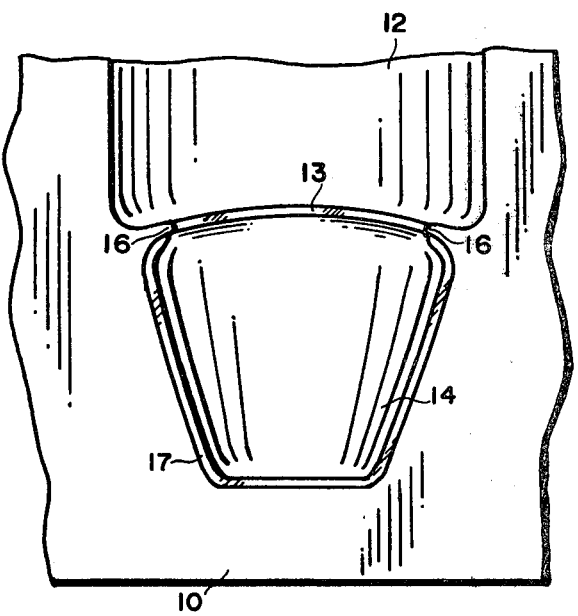
FIG. 2 is a partial view of the face of one half of the mold section of FIG. 1 illustrating the form of the tail flash portion of the mold.

When the parison is blown, the waste portion at the bottom of the mold extrudes into cavity 14 between the mold pair 10 and 11 forming a "tail" flash. As seen in FIG. 2, which is a face view of mold half 10, tail cavity 14 is seen to have a keystone shape. This tail flash 25 formed on the finished bottle 20, as well as the dome flash 23, must be removed from the blown bottle after removal from mold 10 and 11. Tail 25 has a line of reduced cross-sectional area produced by mold part 13 along the bottom of bottle 20 as best seen in FIG. 1. Advantageously, this section which is produced by mold part 13, is much weaker than the main portion of the tail produced in cavity 14. The edges of tail portion 25 are produced by the relief area 17 in the mold sections 10 and 11. Tail 25 also has a pair of notches produced by mold section 13 at either end of the weakened line and indicated in FIG. 2 by the numeral 16.

Figure 8:
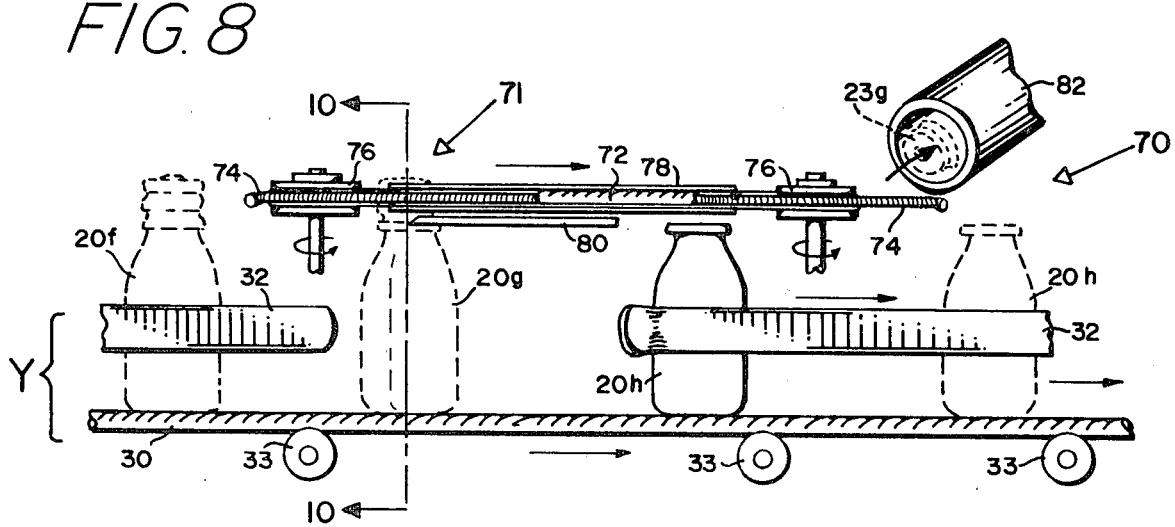
FIG. 8 is a greatly simplified side view of the dome removal section of the invention.

A skeletal side view of the apparatus in accordance with the invention may be seen by a combination of FIGS. 3, 5 and 8 in which the supporting structure and drive systems are omitted for clarity. Such ancillary portions of the apparatus are conventional and any well-known methods and structures may be used for such purpose. The apparatus comprises three main sections: the blow-molding section shown generally as numeral 18 in FIG. 3; the tail removing section generally shown by numeral 40 in FIG. 5; and the dome removal section shown generally by numeral 70 in FIG. 8.

Turning now to FIG. 3 and FIG. 4, details of the mold section 18 will be described. A split mold cavity block is indicated by numeral 5 which in this exemplary illustration contains mold cavities for five bottles, although, of course, any number may be utilized. The mold cavity 9 is indicated for example in FIG. 3 by dashed lines. Directly below mold block 5 is bottle guide 6. As mold block 5 is opened after blowing of a set of bottles, the bottles are allowed to drop in the direction of arrow A with guide passage 7 shown in partial cut-away view in bottle guide 6 causing bottle 20 to drop straight down with its flat side being guided through passage 7 so as to enter a primary conveyor system, shown generally at numeral 29, with tail 25 aligned longitudinally with the direction of motion of conveyor system 29. Conveyor system 29 utilizes a drive rope fabricated from an elastomeric material, with a suitable rope for this purpose being available from the Eagle Company. The rope material is flexible and has a high coefficient of friction along its surface. Idler pulleys 33 are spaced at appropriate intervals along drive rope 30 to provide sufficient support. Side guides 32 are disposed along the line of movement of conveyor rope 30 and spaced as best seen in FIG. 4 to accept the sides of bottle 20. Conveyor rope 30 is displaced slightly from a center line as shown so that tail 25 may drop from the mold free of rope 30. The friction between drive rope 30 and the bottom of bottle 20 as well as with the side of tail 25 causes the rope to move the bottles in the direction shown away from the mold area. As may be understood, the process of molding, dropping of the bottles, and the conveying of the bottles away is a continuous cycle in production.

Turning now to FIG. 5, the tail removal section 40 of the apparatus in accordance with the invention shall be seen. As indicated by the letter X, the apparatus of FIG. 5 is a continuation of and connected directly to the mold section 18 of FIG. 3. Generally, an appropriate length of conveyor 29 will be provided between sections 18 of FIG. 3 and section 40 of FIG. 5 to allow an inspector to observe the flow of bottles and to correct any misalignment or to remove defective bottles. The tail removal section 40 of FIG. 5 utilizes a pair of slightly tapered serrated rollers 44 and 45 as seen in FIG. 5 and FIG. 6. FIG. 6 is a top view of section 40 of the invention with certain parts partially cut away to more clearly reveal the construction thereof. As may be noted, rollers 44 and 45 are disposed with the axes thereof parallel to the direction of travel of the bottles with the small ends of the tapers at the incoming end of section 40 and the large ends touching at the output end of section 40. Rollers 44 and 45 are serrated with knurling type cuts at an angle with the axis of the rollers. The rollers 44, 45 are counter-rotating in an inward and downward direction as indicated by arrows B and C. As the bottle 20 arrives at the tail removal section 40, the tail 25 is aligned horizontally in the direction of movement. It is next required to move bottle 20 through tail removing section 40 positively and, to this end, a separate drive system utilizing drives 49 and 51 is provided. The drives 51 and 49 consist of a drive rope arrangement with parallel drive ropes 50 and 60 on either side of the conveyor such that the sides of bottle 20 are firmly gripped between the two ropes 50 and 60 which cooperate to move the bottles in the desired direction of travel. To provide space for rollers 44 and 45 below the bottles, the tail removal section 40 is displaced slightly from the line of primary drive rope 30 as indicated best in the top view of FIG. 6. Two auxiliary guides 41 and 42 formed from round bar stock are disposed so as to catch bottle 20 just below rim 24 with the spacing between guides 41 and 42 forming a snug fit with the bottle at this point. The positioning of guides 41 and 42 are best seen in FIGS. 5 and 7. A guide plate 48 is utilized as a support for the bottles and to maintain tail 25 in horizontal alignment by means of slot 49 as the bottles leave the primary conveyor rope 30 and proceed into tail removal section 40. As a bottle moves into position as shown by bottle 20a in FIG. 5, it may be noted that tail 25a will move between the small ends of rollers 44 and 45. As shown in FIG. 5, bottle 20b has moved to the point where the leading edge of tail 25b is contacted by counterrotating rollers 44 and 45. As the serrations thereon grip the soft plastic of tail 25b, a downward directed force shown by arrow D will be applied over a narrow strip along the leading edge. This downward force combines with the translational force due to the movement of the bottle by conveyor elements 51 and 49 to produce a force vector downward and rearward tending to tear the leading edge of tail 25b from the bottom of bottle 20b. In accordance with the invention, the notch at 16 (see FIG. 2) and the reduced cross-section due to section 13 of the mold (see FIG. 1 and FIG. 2) will result in a tear beginning at this point. Bottle 20c, having moved further into the tapered rollers 44 and 45, experiences the downward and rearward force over a larger area of tail 25c resulting in a force vector E at a more acute rearward angle continuing the tearing action of the reduced thickness web of tail 25c. This process, of course, continues and as shown for bottle 20d has resulted in almost totally separation of tail 25d from the body of bottle 20d. Bottle 20e has progressed along rollers 44 and 45 to the point where its tail 25e has been completely removed. The tail 25e and an earlier removed tail are shown dropping in the direction F to a waste recovery system. The waste recovery system (not shown) utilizes a small hopper and vacuum system which catches the waste plastic and sends it back for recycling. The remainder of the bottles shown in FIG. 5 having the tail portions removed are carried by secondary conveyors 51 and 49 via guides 41 and 42 back into guides 32 and onto primary conveyor rope 30 for further processing.

The advantageous result of the novel design of molds 10 and 11 to produce the narrow web by mold portion 13 and the notches 16 results in a clean, smooth removal of the tail 25 from bottle 20 with no damage to the bottom of the bottle. As may be noted most clearly in FIG. 7, the tail guide 45 firmly supports the base of bottle 20b as the tail portion is being torn free, thus preventing distortion or damage to the bottom of bottle 20b. It is pertinent to note that placing the tail removal section 40 immediately after the ejection of the bottles from mold 9 onto primary conveyor 29 results in the plastic remaining relatively hot and pliable; therefore, the tearing action just described is easily and cleanly accomplished.

Figure 9:
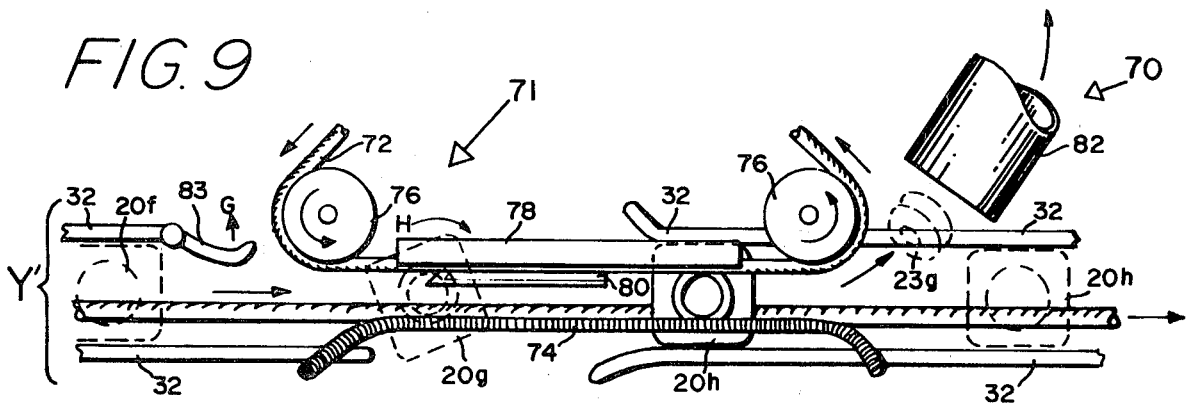
FIG. 9 is a greatly simplified top view of the dome removal section of the invention showing additional details thereof.

Next, the output from tail removal section 14 at Y of FIGS. 5 and 6 connect to the input Y of dome removal section 70 shown in FIGS. 8 and 9. Dome removal section 70 utilizes a secondary drive system shown generally by 71 comprising drive rope 72, drive pulleys 76, and serrated guide 74. A horizontal cutter 80, having a cutting edge aligned with the direction of travel of the bottles is utilized for cleanly removing dome section 23 from the bottles. Secondary conveyor 71 is provided to move the bottle positively in the direction of travel and simultaneously to rotate the bottle against the cutter 80 to effect the desired removal of the dome section 23. As a bottle 20f in FIG. 8 is carried into the dome removal section 70, it encounters a spring-loaded section 83 of guide 32. The purpose of this guide section 83 is to slow the forward movement of bottle 20f slightly to allow the previously released bottle 20g to move ahead slightly with a space between the two successive bottles so that each bottle can freely rotate without mutual interference.

Figure 10:
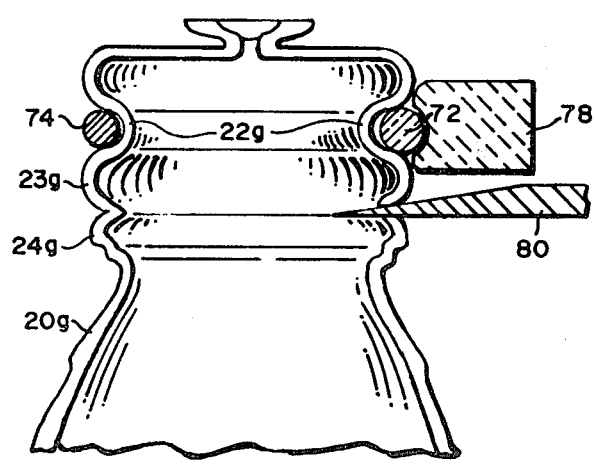
FIG. 10 shows a partial cross-section of a container moving through the dome removal section of FIGS. 8 and 9, showing in greater detail the secondary drive and rotational system of the invention, and the cutter for removing the dome flash portion.

The action of secondary conveyor 71 is best understood from a partial cross-sectional view of bottle 20g shown in FIG. 10. Drive rope 72 moves in a groove in a guide block 78 constructed of a material such as Teflon or Nylon in which it may slide freely yet be firmly supported against groove 22g advantageously formed in waste portion 23g of bottle 20g by mold portion 15' of FIG. 1. Serrated bar 74, shown in cross-section, is held firmly against groove 22g directly opposite from drive rope 72. The spacing between serrated bar 74 and drive rope 72 is such that dome 23g is squeezed in slightly at groove 22g with the natural resilience of the plastic material thereby providing a firm purchase between both the drive rope 72 and bar 74. The serrations on bar 74 bite slightly into the soft plastic and thereby prevent slippage of the bottle 20g as it is then rotated by the forward movement of drive rope 72. This rotation is indicated at H in FIG. 9. As bottle 20g encounters the forward edge of cutter 80, the cutter cuts through the plastic at the top lip of rim 24g just below dome section 23g. As the bottle is rotated and moved along in the direction of travel, the blade 80 then cleanly cuts the plastic until 360 degrees of rotation has occurred at which time the dome section 23g will be free from the main part of bottle 20g. At this point the bottle is released from secondary drive 71 and, as shown by bottle 20h, is caught by primary conveyor rope 30 and carried out of the dome removal section 70. The cut away dome 23g is carried by secondary conveyor 71 and as discharged is caught by a vacuum from scavenger tube 82 and carried to the waste recycling system. The completely finished and trimmed bottles as at 20h are then delivered by the main conveyor system 29 for final inspection, packing, labeling, or other processing.

The rate at which bottles or other containers can be formed and trimmed in accordance with the invention is a function of the basic blow mold machine design. The tail removal and dome removal portions of the invention can operate at relatively high speeds and will not limit the output. For example, each operation requires only a few seconds, and in one embodiment of the invention the time from beginning of molding to the completely trimmed bottle has been found to be less than 30 seconds. A typical bottle may require on the order of three minutes to cool to its final state, therefore, this short time permits the bottle to remain soft and plastic during the above-described operations.

As may be recognized from the operational description of the apparatus in accordance with the present invention, the process may be seen to be one of molding the waste or flash portions of a container or similar blown article in a manner to simplify and assist in removal of such flash portions. The method contemplates specifically: molding a turning groove in the dome portion of the article; molding a weakened portion where the tail connects to the article; ejecting the article from the mold; moving the article into a gripping and tearing device; creating a force vector tending to start a tearing action at the weakened line area of the tail at its leading edge; carrying the article forward to thereby cleanly tear the tail free from the article; gripping the groove in the dome waste portion of the article securely by a conveying and rotating device; and moving the article along a sharpened cutting edge disposed at the parting line between the waste dome and the article, such that the article rotates as it moves along the cutting edge thereby cleanly cutting the waste dome free from the article.

It is also important to note that the trimming operations in accordance with the present invention permits full output of a blow molding machine to be maintained without delay incurred for such trimming operations. Therefore, savings in operational time and production rates are obtained over prior art methods.

While the preferred embodiment of the invention has been shown with respect to a specific type of bottle and a specific arrangement of the elements thereof, it is clear that many modifications and changes in details may be made by those of ordinary skill in the art without departing from the spirit and scope of the invention.

I claim:

1. A method for trimming an unwanted tail flash portion from molded plastic containers, said method comprising the steps of:
   conveying said containers along a first direction;
   providing a gripping means having gripping surfaces aligned with said first direction;
   positioning said gripping means to engage and grip said tail flash portion of each of said containers while said containers are conveyed along said first direction; and
   producing a downward and rearward tearing force on said tail flash portion immediately after said engagement with said gripping means to effectuate a complete removal of the unwanted portion by said tearing force.

2. The method as defined in claim 1 which includes the further step of increasing said tearing force in proportion to the distance traveled by said containers during said complete removal.

3. The method as defined in claim 1 wherein said conveying step includes the steps of:
   engaging said containers with an endless rope of elastomeric material, said endless rope having an engaging section thereof moving along said first direction; and
   guiding said containers in said first direction.

4. A method for separating tail flash portions from molded plastic containers comprising the steps of:
   conveying said containers in a first direction;
   directing said tail flash portions into and between a pair of rollers horizontally opposed along said first direction, said rollers each having a slight taper with respect to said first direction such that said rollers are separated at an input end by a space greater than the thickness of said tail flash portion and at the output end by a space less than said thickness, said rollers each having serrations around the periphery thereof;
   rotating said rollers in opposite directions of rotation so that the opposing surfaces thereof are each moving in a downward direction;
   gripping the forward edge of said tail flash portions by said rotating rollers;
   imparting a downward and rearward tearing force to said tail flash portion as said containers move in said first direction; and
   increasing said tearing force in proportion to the distance of travel of said containers along said rollers effectuating complete removal of said tail flash portion.

5. A method for making a plastic container having an unwanted tail flash portion connected along the bottom of said container comprising the steps of:
   molding a plastic container in a mold so as to produce a weakened area along a line in the unwanted tail flash portion adjacent said bottom of said container;
   removing the container from the mold;
   conveying the container along a first direction;
   gripping the tail portion progressively as the container is conveyed along the first direction;
   producing a downward and rearward tearing force to the tail flash portion with respect to said container as the container moves along the first direction; and
   tearing the tail flash portion free from the container by such tearing force along the weakened area.

6. The method as defined in claim 5 in which the tearing force production step includes the step of increasing the tearing force in proportion to the distance the container moves along the first direction.

* * * * *